United States Patent
Canney et al.

(10) Patent No.: US 12,340,391 B2
(45) Date of Patent: *Jun. 24, 2025

(54) TRACKING PERFORMANCE OF RECOMMENDED CONTENT ACROSS MULTIPLE CONTENT OUTLETS

(71) Applicant: Oracle International Corporation, Redwood Shores, CA (US)

(72) Inventors: Jason Loring Canney, Highlands Ranch, CO (US); Andrew John Grabowski, Northglenn, CO (US); Hilary Joy Traut, Boulder, CO (US); Alexander Mark Robbe, Denver, CO (US); Richard Martin Berger, Boulder, CO (US); Megan Margraff, Trumbull, CT (US); Mohit Gupta, Redwood Shores, CT (US); Debra Eskra, Redwood Shores, CO (US); Alistair Sutcliffe, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,292

(22) Filed: May 28, 2024

(65) Prior Publication Data

US 2024/0311863 A1  Sep. 19, 2024

Related U.S. Application Data

(63) Continuation of application No. 18/158,221, filed on Jan. 23, 2023, now Pat. No. 12,026,740.

(51) Int. Cl.
*G06Q 30/0242* (2023.01)
*G06F 16/958* (2019.01)
*H04L 67/50* (2022.01)

(52) U.S. Cl.
CPC ....... *G06Q 30/0242* (2013.01); *G06F 16/958* (2019.01); *H04L 67/535* (2022.05)

(58) Field of Classification Search
CPC .. G06Q 30/0242; G06F 16/958; H04L 67/535
See application file for complete search history.

(56) References Cited

U.S. PATENT DOCUMENTS

| | | | |
|---|---|---|---|
| 10,600,073 B2 | 3/2020 | Avner | |
| 2006/0026063 A1* | 2/2006 | Collins | G06Q 30/02 705/14.42 |

(Continued)

OTHER PUBLICATIONS

Final Office Action for U.S. Appl. No. 18/158,221, dated Sep. 8, 2023.

(Continued)

*Primary Examiner* — Alexandru Cirnu
(74) *Attorney, Agent, or Firm* — Mughal Gaudry & Franklin PC

(57) ABSTRACT

The present disclosure relates to systems and methods for tracking content across multiple content outlets. Content items, characterized by first metadata, and content slots, characterized by second metadata, can be received. Third metadata for digital content slots can be generated. Fourth metadata can be received. A recommended content item package can be provided based on a comparison between a combination of the first metadata, the second metadata, and the third metadata and the fourth metadata. The recommended content item package can include a content file and a metadata file. A performance and a measurement of the recommended content item package can be determined by executing the metadata file to track the content file across one or more of the content slots and the potential digital content slots. The performance and the measurement can be provided.

18 Claims, 8 Drawing Sheets

(56) References Cited

U.S. PATENT DOCUMENTS

| | | |
|---|---|---|
| 2011/0218850 A1 | 9/2011 | Kaufman et al. |
| 2014/0236707 A1 | 8/2014 | Brooks et al. |
| 2015/0339699 A1 | 11/2015 | Avner |
| 2021/0334846 A1* | 10/2021 | Begeja ............... G06Q 30/0275 |

OTHER PUBLICATIONS

Hajnik, Z. (2014). Big Five Personality Traits in Marketing: A Literature Review. Vienna; University of Vienna, 37 pages.

Non-Final Office Action for U.S. Appl. No. 18/158,221, dated Jun. 1, 2023.

Notice of Allowance for U.S. Appl. No. 18/158,221, dated Feb. 28, 2024.

* cited by examiner

TRACKING PERFORMANCE OF RECOMMENDED CONTENT ACROSS MULTIPLE CONTENT OUTLETS

CROSS-REFERENCE TO RELATED APPLICATIONS

This application is a continuation of and claims priority to U.S. Non-Provisional patent application Ser. No. 18/158,221, filed on Jan. 23, 2023, titled "TRACKING PERFORMANCE OF RECOMMENDED CONTENT ACROSS MULTIPLE CONTENT OUTLETS," which is incorporated by reference in its entirety for all purposes.

TECHNICAL FIELD

The present disclosure relates to systems and methods for tracking content. More particularly, the present disclosure relates to systems and methods that track recommended content across multiple content outlets to enhance the content.

BACKGROUND

Content can be presented to a receiving entity, such as a user of a computing device, of a display device, and the like. The content may be presented to multiple different content outlets, which may include linear outlets, digital outlets, and the like. In some examples, the content can be characterized by a measurement, performance, and the like with respect to the receiving entity. For example, the user may be receptive to the content, may ignore the content, etc. Determining the measurement or the performance may be difficult across the multiple different content outlets.

SUMMARY

In some embodiments, a computer-implemented method is provided for tracking performance of recommended content across multiple content outlets. For example, a computing device may receive a set of content items from a providing entity. Each content item of the set of content items may be characterized with first metadata that corresponds to a set of tags of one or more user profiles. Additionally, the computing device may receive a set of content slots. Each content slot of the set of content slots may be characterized by second metadata that is different than the first metadata. The second metadata may correspond to a set of tags of content adjacent to respective content slots of the set of content slots. The computing device may generate third metadata for one or more potential digital content slots that may be configured to provide the content item on a webpage via a content providing entity. The third metadata may be different than the first metadata and the second metadata, and the third metadata may corresponding to a set of tags of content surrounding respective potential digital content slots of the one or more potential digital content slots. The computing device may receive, from the providing entity, fourth metadata that indicates a set of tags of potential content to provide to a receiving entity on behalf of the providing entity. The receiving entity may have a user profile included in the one or more user profiles. The computing device may provide a recommended content item package to the content providing entity. The recommended content item package may be generated by comparing a combination of the first metadata, the second metadata, and the third metadata to the fourth metadata. The recommended content item package may represent a recommended content item having first metadata corresponding to the fourth metadata, and the recommended content item package may include a content file and a metadata file. The content file, when executed, can provide the recommended content item to the receiving entity, and the metadata file, which can be coupled to the content file, can provide details about and track instances in which the recommended content item is provided via one or more content slots of the plurality of content slots or one or more potential digital content slots of the one or more potential digital content slots. The computing device can determine a performance of the recommended content item package and a measurement of the recommended content item package by executing the metadata file to track the content file across the one or more content slots and the one or more potential digital content slots. The computing device can provide the performance and the measurement to the providing entity.

In some embodiments, the set of content slots can be provided by one or more first content outlets, the one or more potential digital content slots can be provided by one or more second content outlets, and the one or more first content outlets can be disjunctive with respect to the one or more second content outlets.

In some embodiments, the method can further include executing, by the computing device, the metadata file to receive the details about the recommended content item. The details can include data from the one or more first content outlets and the one or more second content outlets, and the metadata file can be executed to track the recommended content item across the one or more first content outlets and the one or more second content outlets.

In some embodiments, the metadata file can be a hidden file that is automatically executed, in response to executing the content file, to track the content file across one or more first content outlets and one or more second content outlets that are disjunctive with respect to the one or more first content outlets.

In some embodiments, the first metadata can indicate (i) a likelihood of the receiving entity interacting with a corresponding content item, and (ii) a tone of the corresponding content item. The second metadata can indicate a tone of content surrounding a corresponding content slot. The third metadata can indicate a tone of content surrounding a corresponding potential digital content slot. The fourth metadata can indicate (i) a likelihood of the receiving entity interacting with a corresponding potential content item, and (ii) a tone of the corresponding potential content item.

In some embodiments, the method can further include identifying the recommended content item based on comparing the combination of the first metadata, the second metadata, and the third metadata to the fourth metadata. Comparing the combination of the first metadata, the second metadata, and the third metadata to the fourth metadata can involve (i) determining that a particular subset of the first metadata corresponding to the recommended content item is most similar to the fourth metadata and (ii) accessing, via a query to a data repository including the first metadata, the recommended content item to generate the recommended content item package.

In some embodiments, the performance can include a performance report provided to the providing entity. The performance report can include (i) an indication of how frequently the receiving entity interacted with the recommended content item, and (ii) a number of instances the recommended content item was inserted into one or more content slots or one or more potential digital content slots.

The measurement can include a measurement report used by the computing device to adjust the recommended content item package. The measurement report can include an indication of a similarity between the first metadata of the recommended content item and (i) the second metadata of content slots, or (ii) the third metadata of potential digital content slots, into which the recommended content item was inserted.

In some embodiments, a computer-program product is provided that is tangibly embodied in a non-transitory machine-readable storage medium and that includes instructions configured to cause one or more data processors to perform various operation. The operations can include receiving a set of content items from a providing entity and a set of content slots. Each content item of the set of content items may be characterized with first metadata that corresponds to a set of tags of one or more user profiles. Each content slot of the set of content slots may be characterized by second metadata that is different than the first metadata. The second metadata may correspond to a set of tags of content adjacent to respective content slots of the set of content slots. The operations may include generating third metadata for one or more potential digital content slots that may be configured to provide the content item on a webpage via a content providing entity. The third metadata may be different than the first metadata and the second metadata, and the third metadata may correspond to a set of tags of content surrounding respective potential digital content slots of the one or more potential digital content slots. The operations can include receiving, from the providing entity, fourth metadata that indicates a set of tags of potential content to provide to a receiving entity on behalf of the providing entity. The receiving entity may have a user profile included in the one or more user profiles. The operations can include providing a recommended content item package to the content providing entity. The recommended content item package may be generated by comparing a combination of the first metadata, the second metadata, and the third metadata to the fourth metadata. The recommended content item package may represent a recommended content item having first metadata corresponding to the fourth metadata, and the recommended content item package may include a content file and a metadata file coupled to the content file. The content file, when executed, can provide the recommended content item to the receiving entity. The metadata file, when executed, can provide details about and track instances in which the recommended content item is provided via one or more content slots of the set of content slots or one or more potential digital content slots of the one or more potential digital content slots. The operations can include determining a performance of the recommended content item package and a measurement of the recommended content item package by executing the metadata file to track the content file across the one or more content slots and the one or more potential digital content slots. The operations can include providing the performance and the measurement to the providing entity.

In some embodiments, a system is provided that includes one or more data processors and a non-transitory computer readable storage medium including instructions which, when executed on the one or more data processors, cause the one or more data processors to perform various operations. The system can receive a set of content items from a providing entity and a set of content slots. Each content item of the set of content items can be characterized with first metadata that corresponds to a set of tags of one or more user profiles. Each content slot of the set of content slots can be characterized by second metadata that is different than the first metadata. The second metadata may correspond to a set of tags of content adjacent to respective content slots of the set of content slots. The system can generate third metadata for one or more potential digital content slots that may be configured to provide the content item on a webpage via a content providing entity. The third metadata may be different than the first metadata and the second metadata, and the third metadata may correspond to a set of tags of content surrounding respective potential digital content slots of the one or more potential digital content slots. The system can receive, from the providing entity, fourth metadata that indicates a set of tags of potential content to provide to a receiving entity on behalf of the providing entity. The receiving entity can have a user profile included in the one or more user profiles. The system can provide a recommended content item package to the content providing entity. The recommended content item package can be generated by comparing a combination of the first metadata, the second metadata, and the third metadata to the fourth metadata. The recommended content item package can represent a recommended content item having first metadata corresponding to the fourth metadata, and the recommended content item package can include a content file and a metadata file coupled to the content file. The content file, when executed, can provide the recommended content item to the receiving entity. The metadata file, when executed, can provide details about and track instances in which the recommended content item is provided via one or more content slots of the set of content slots or one or more potential digital content slots of the one or more potential digital content slots. The system can determine a performance of the recommended content item package and a measurement of the recommended content item package by executing the metadata file to track the content file across the one or more content slots and the one or more potential digital content slots. The system can provide the performance and the measurement to the providing entity.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
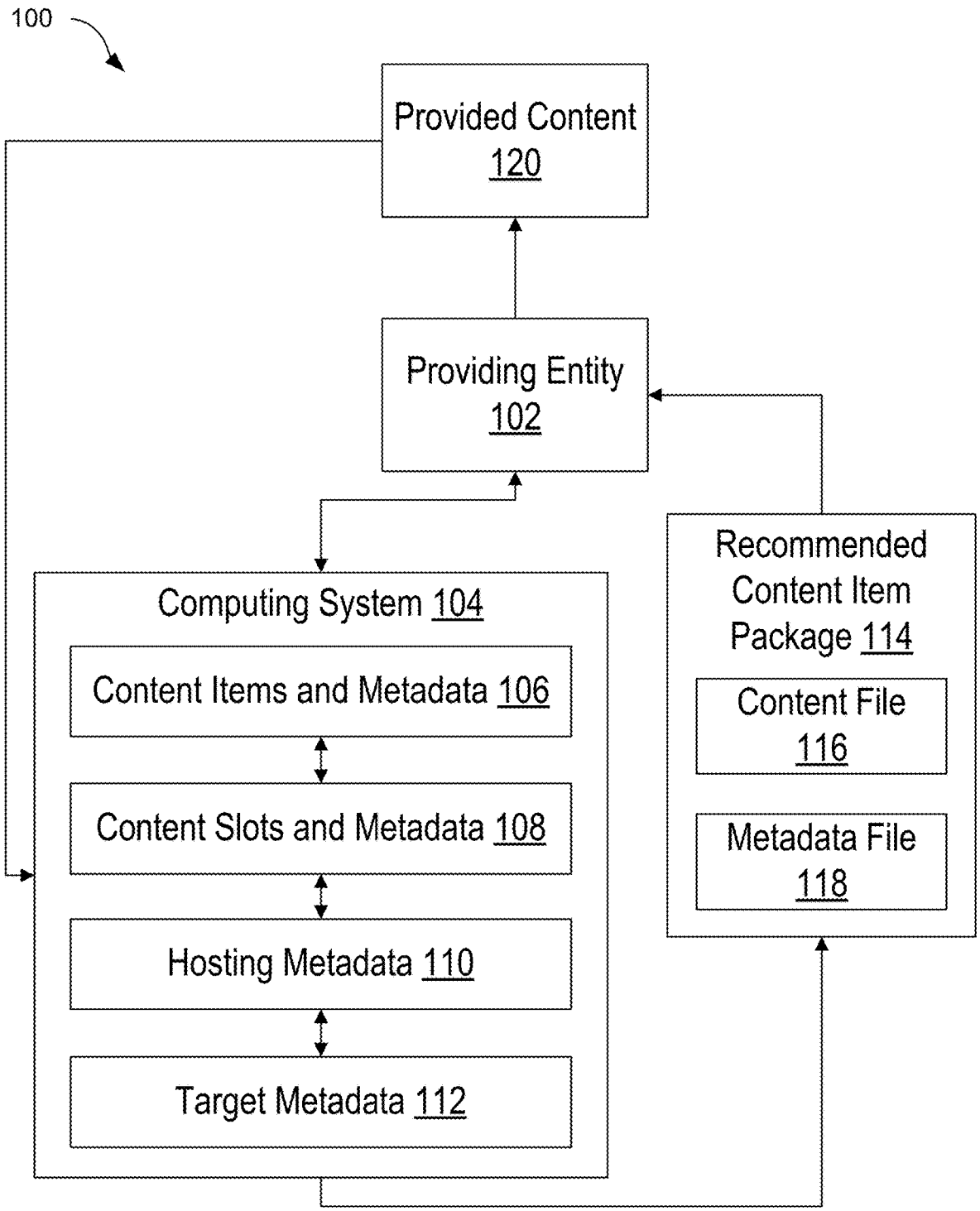
FIG. 1 is a block diagram illustrating an example of a data processing environment for tracking recommended content across multiple content outlets according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview

Certain aspects and features of the present disclosure relate to tracking content across multiple content outlets. The content may include content items, recommended content items, information inferred from content items, and the like across the multiple content outlets. A content item may include text, images, interactive features, and other content that can be provided to a receiving entity such as a user of a computing device. A content outlet may involve one or more techniques, locations, providers, or the like for providing content. For example, the multiple content outlets may include a linear content outlet, a persistent content outlet, a digital content outlet, any providing entities thereof, and the like.

The linear content outlet may include content slots that are configured to be provided in a predetermined order with respect to other content slots. In a particular example, the linear content outlet may include a television provider or other linear content outlet that provides content chronologically. The persistent content outlet may include content slots that are configured to be provided simultaneously with respect to one or more additional content slots. In a particular example, the persistent content outlet may include a content streaming service that can provide a first content item, such as a video, simultaneous with a second content item such as an interactive feature. The digital content outlet may include content slots, such as potential digital content slots, that are configured to be provided via a web page, an application accessible via a mobile computing device, or other interactive computing environment. In a particular example, the digital content outlet may include a web page provider that controls or generates a web page with one or more potential digital content slots that can receive a content item.

The multiple content outlets may be disjunctive with one another or may otherwise not be communicatively coupled with one another. For example, the linear content outlet, or any content providing entity thereof, may not share data or otherwise communicate with the persistent content outlet and/or the digital content outlet, or any content providing entity thereof, about provided content. The linear content outlet, the persistent content outlet, the digital content outlet, and/or any additional content outlets may independently provide content and may independently generate inferences or other data based on providing the content. Providing entities, such as providers of goods and/or services, content generating entities, or the like, may be interested in analyzing, for example to adjust the provided content or to improve a recommendation of content to provide, etc., the inferences or other data based on the multiple content outlets providing the content.

Techniques, such as those disclosed herein, can be used to track content provided across the multiple content outlets. Tracking content provided across the multiple content outlets may involve measuring a performance of a particular content item, separately measuring a performance of each content slot, or a subset thereof, of each of the multiple content outlets, or the like. In an example, a system can be used to generate a recommended content item package. The system can generate the recommended content item package based on various metadata generated or otherwise received by the system. For example, the system can receive (i) first metadata, such as content metadata, about potential content that can be recommended to be provided to the receiving entity, (ii) second metadata, such as slot metadata, about content slots in which the potential content can be inserted, (iii) third metadata, such as hosting metadata, about potential digital content slots in which the potential content can be inserted, and/or (iv) fourth metadata, such as target metadata, that corresponds to a desired type of content to be provided to the receiving entity. In some examples, the system can generate one or more of the received metadata such as the third metadata, etc. In a particular example, the system, to generate the third metadata corresponding to the potential digital content slots, can access one or more web pages that include the potential digital content slots and can analyze the text, images, and other content adjacent to the potential digital content slots. Additionally or alternatively, one or more of the various types of metadata, such as the first metadata, the second metadata, and the like, can be received by the system from the providing entity.

In some examples, the various different types of metadata received by the system may each indicate tags, a tone, a potential reception by a receiving entity, and the like for the corresponding content items, content slots, etc. For example, the first metadata may indicate how the receiving entity may perceive the corresponding content items, may indicate a tone of the content items, or the like. Additionally or alternatively, the first metadata may correspond to a set of tags included in one or more user profiles. Tags of the set of tags included in a particular user profile may indicate a personality, a style, and the like of a user corresponding to the particular user profile. For example, the first metadata may indicate an activity, an aggressiveness, a responsibility, an emotionality, and a simplicity of corresponding content items, and the indications of the first metadata may correspond to the set of tags of the one or more user profiles. In another example, the second metadata may indicate how the receiving entity may perceive the corresponding content slots, content items surrounding the corresponding content slots, an environment of the corresponding content slots, etc., and the second metadata may indicate a tone of the corresponding content slots, content items surrounding the corresponding content slots, an environment of the corresponding content slots, etc., or the like. Additionally or alternatively, the second metadata may correspond to a second set of tags of the corresponding content slots, content items surrounding the corresponding content slots, an environment of the corresponding content slots, etc., or the like. For example, the second metadata may indicate an activity, an aggressiveness, a responsibility, an emotionality, and a simplicity of corresponding content slots, content items surrounding the corresponding content slots, the environment of the corresponding content slots, etc.

The recommended content item package can be generated by the system based on the various different types of metadata. For example, the system can compare the fourth metadata to a combination of the first metadata, the second metadata, and the third metadata to identify one or more potential content items to recommend providing to the receiving entity. In a particular example, the system compares the fourth metadata to the first metadata, the second metadata, and/or the third metadata to determine a closest match to the fourth metadata. A closest match may involve first metadata that is individually most similar to the fourth metadata or that is most similar to the fourth metadata in combination with the second metadata and/or the third metadata. The system can identify a potential content item corresponding to the first metadata most similar to the fourth metadata, and the system can generate the recommended content item package based on the potential content item.

The recommended content item package can include a content file, a metadata file, and other components that can be used to provide and track the recommended content item. The content file may include computer-executable instructions, such as program code, that can be executed to provide the recommended content item. For example, the system can provide (e.g., directly or indirectly) the recommended content item package to one or more (or each) of the content outlets, and the corresponding content outlets can access the content file and execute the content file to provide the recommended content item to the receiving entity. The metadata file may include computer-executable instructions, such as program code, that can be executed to track the recommended content item. For example, the corresponding content outlet can execute the metadata file each instance that the recommended content item is provided to update tracking information for the recommended content item. Additionally, the metadata file may persist across multiple content outlets. In some examples, the metadata file may be or include a hidden file that, upon execution of the content file, automatically executes to include updated information about the corresponding instance of providing the recommended content item.

The system can, periodically, in response to a request, or subsequent to a final instance of providing the recommended content item, generate performance data, measurement data, and the like for the recommended content item package or any components thereof. For example, in response to a request from the providing entity, the system can access the recommended content item package and execute the metadata file to retrieve information generated in response to providing the recommended content items to the receiving entity. Executing the metadata file may cause the system to receive data, over a predetermined period of time, including a number of instances of providing the recommended content item, a number of times the content file was executed, a number and types of interactions by the receiving entity with the recommended content item, a reception of the receiving entity to the provided instances of the recommended content item, and the like. The system may analyze the data received from executing the metadata file to generate a performance report, a measurement report, and the like, which can each be used to track the recommended content item package, or any component thereof, across multiple content outlets.

The performance report may include an indication of a likelihood of the receiving entity interacting with, being receptive to, etc., the recommended content item provided via the recommended content item package. In some examples, the performance report may indicate a usefulness, a success, an efficacy, or the like of the recommended content item. Additionally, the measurement report may include an indication of similarity between the first metadata of the recommended content item and the second metadata of content slots, or the third metadata of potential digital content slots, into which the recommended content item was inserted. In some examples, the measurement report may indicate a usefulness, a success, an efficacy, or the like of the recommended content item package. For example, the system may use the measurement report to adjust a recommendation engine to improve subsequent recommended content item packages. The performance report, the measurement report, and/or the other metrics generated by the system based on execution of the metadata file may include other indications of performance or measurement of the recommended content item package or any component thereof.

Example of an Environment for Tracking Recommended Content Across Multiple Content Outlets FIG. 1 is a block diagram illustrating an example of a data processing environment 100 for tracking recommended content across multiple content outlets according to an embodiment. As illustrated, the data processing environment 100 includes at least a providing entity 102 and a computing system 104. The providing entity 102 may include a provider of goods or services, an entity configured to provide digital content or services to a receiving entity, such as a user of a computing device, or other suitable entity that can provide content to the receiving entity. The providing entity 102 may be communicatively coupled to the computing system 104. For example, the providing entity 102 can include or otherwise use a remote computing device that can communicate, for example via a communication network, with the computing system 104. The providing entity 102 can provide content, content metadata (e.g., the first metadata), target metadata (e.g., the fourth metadata), and the like to the computing system 104 to initiate or otherwise facilitate tracking of content across content outlets.

The computing system 104 may receive content items and metadata 106, content slots and metadata 108, hosting metadata 110 (e.g., the third metadata), target metadata 112, other suitable data or metadata, or any combination thereof. In some examples, the computing system 104 may generate one or more of the content items and metadata 106, the content slots and metadata 108, the hosting metadata 110, the target metadata 112, other suitable data or metadata, or any combination thereof. In a particular example, the computing system 104 may receive the content items and metadata 106 from the providing entity 102, may receive the content slots and metadata 108 from the providing entity 102, may generate the hosting metadata 110, and may receive the target metadata 112 from the providing entity 102.

The content items and metadata 106 may include content items and content metadata associated with the content items. The content items may include interactive content or noninteractive content that can be provided to the receiving entity. Examples of the content items can include a user interface or other interactive computing environment, a message (e.g., an advertisement, an update, etc.) from or otherwise generated by the providing entity 102, and the like. The content metadata can include metadata about or that characterizes the content items. For example, the content metadata may include tags that indicate how the receiving entity may perceive the corresponding content items, may indicate a tone of the content items, or the like. The tags may correspond to a user profile of a receiving entity. In a particular example, the content metadata may indicate an activity, an aggressiveness, a responsibility, an emotionality, and a simplicity of corresponding content items. The content metadata may indicate other suitable information, such as a personality, a reception, and the like, about the corresponding content items.

The content slots and metadata 108 may include content slots and slot metadata (e.g., the second metadata) associated with the content slots. The content slots may include places that content items can be provided to the receiving entity. For example, the content slots can include linear content slots, persistent content slots, digital content slots, and the like. The linear content slots may be presented chronologically with respect to other content items, the persistent content slots may be presented simultaneously with other content items, and the digital content slots may be presented digitally, for example on a web page, a mobile application, or the like. The slot metadata may include metadata about or that characterizes the content slots. For example, the slot metadata may include tags that indicate how the receiving entity may perceive the corresponding content slots, content items surrounding the corresponding content slots, an environment of the corresponding content slots, etc., and the slot metadata may indicate a tone of the corresponding content slots, content items surrounding the corresponding content slots, an environment of the corresponding content slots, etc., or the like. In a particular example, the slot metadata may indicate an activity, an aggressiveness, a responsibility, an emotionality, and a simplicity of corresponding content slots, content items surrounding the corresponding content slots, the environment of the corresponding content slots, etc. The slot metadata may indicate other suitable information, such as a personality, a reception, and the like, about the corresponding content slots, content items surrounding the corresponding content slots, the environment of the corresponding content slots, and the like.

The hosting metadata 110 may include metadata relating to potential digital content slots in which content items, which may be recommended by the computing system 104, can be presented or otherwise provided. The potential digital content slots may be positioned on, or otherwise associated with, one or more web pages. In some examples, the computing system 104 can access the one or more web pages, can analyze the content provided by the one or more web pages, and generate the hosting metadata 110 based on the content provided by the one or more web pages. Analyzing the content provided by the one or more webpages can involve classifying text, images, and the like provided by the one or more web pages and surrounding or adjacent to the potential digital content slots. The text, images, and the like can be classified within the context of personality dimensions, or tags thereof, which can include extraversion, agreeableness, conscientiousness, emotional stability, openness, and the like. For example, the computing system 104 may determine a measure of extraversion, agreeableness, conscientiousness, emotional stability, openness, and the like indicated by the text, images, etc. provided by the one or more web pages.

The target metadata 112 may include metadata of desired content to be provided by the providing entity 102. The providing entity 102 may provide target content characteristics for the computing system 104 to use for generating content recommendations and tracking. The target content characteristics may include tags that indicate a type of content item, a tone of content item, and the like to provide to the receiving entity. The target content characteristics can additionally include the target metadata 112. In some examples, the target metadata 112 includes metadata of potential content to provide to the receiving entity, and the computing system 104 may use the target metadata 112 as a target value. For example, the computing system 104 may determine content to recommend to provide to the receiving entity based on a closeness of metadata of the determined content to the target metadata 112. In some examples, the target metadata 112 may indicate an activity, an aggressiveness, a responsibility, an emotionality, and a simplicity of potential or desired content items. The target metadata 112 may indicate other suitable information, such as a personality, a reception, and the like, about the potential or desired content items.

The computing system 104 can use the content items and metadata 106, the content slots and metadata 108, the hosting metadata 110, the target metadata 112, other suitable information, or a combination thereof to generate a recommended content item package 114. The recommended content item package 114 can include a content file 116, a metadata file 118, and other suitable components. The content file 116 can include machine-executable code that, when executed, can provide a recommended content item to the receiving entity. The metadata file 118 can include machine-executable code that, when executed, can provide details about the recommended content item, can track the recommended content item, and the like. The computing system 104 can perform one or more operations involving various types of metadata to generate the recommended content item package 114. For example, the computing system 104, or any component thereof, can compare content metadata, slot metadata, hosting metadata, and the like to the target metadata 112 to generate the recommended content item package 114. In a particular example, the computing system 104 can execute a content recommendation engine to determine, based on a given content slot or potential digital content slot, the recommended content item that includes content metadata most similar to a combination of the target metadata 112, the hosting metadata, and/or the slot metadata. Additionally, the computing system 104 can generate the metadata file 118 based on the content file 116.

The computing system 104 can transmit the recommended content item package 114 to the providing entity 102. For example, the computing system 104 can transmit the recommended content item package 114 to the providing entity 102 over the communication network. The providing entity 102 can execute the recommended content item package 114, can transmit the recommended content item package 114 to a remote computing device (e.g., the computing system 104, subcomponents thereof, a different computing device, and the like) for executing the recommended content item package 114, or the like. Executing the recommended content item package 114 can involve executing the content file 116 to provide the recommended content item to the receiving entity. For example, the providing entity 102 can execute the recommended content item package 114 to provide the receiving entity with provided content 120 in response to executing the content file 116 of the recommended content item package 114. In some examples, the provided content 120 can include the recommended content item, such as an advertisement, a user interface, or the like.

Additionally or alternatively, the providing entity 102, or the remote computing device, can execute the metadata file 118 to track the provided content 120. In some examples, the metadata file 118 can be executed one or more predetermined time periods after initially providing the provided content 120 to the receiving entity. Executing the metadata file 118 may provide details relating to the provided content 120 and the receiving entity. For example, executing the metadata file 118 may provide information, such as particular content slots in which the provided content 120 was inserted, a number of instances of the provided content 120, and the like, to the providing entity 102, the remote computing device, and the like.

In some examples, the computing system 104 may receive, for example from the providing entity 102, the remote computing device, or the like, results from executing the metadata file 118. In other examples, the computing system 104 may receive the recommended content item package 114 after the provided content 120 is provided to the receiving entity, and the computing system 104 may execute the metadata file 118 included in the recommended content item package 114. The computing system 104 can use the results from executing the metadata file 118 to generate metrics to provide to the providing entity 102 for tracking the recommended content item package 114 or any component thereof. The metrics may include a performance of the recommended content item, a measurement of the recommended content item, other suitable metrics associated with the recommended content item, or any combination thereof. The performance may include an indication of how the recommended content item performed. For example, the performance may indicate a likelihood of the receiving entity interacting with, being receptive to, etc., the recommended content item. The measurement may include an indication of similarity between the content metadata of the recommended content item and the slot metadata of content slots, or the hosting metadata of potential digital content slots, into which the recommended content item was inserted.

The performance and the measurement, and/or other suitable metrics, may be tracked across multiple content outlets. For example, the provided content 120 may be provided to the receiving entity via a linear content outlet, a persistent content outlet, a digital content outlet, or the like. The linear content outlet may provide content in a particular order, the persistent content outlet may provide content simultaneous with other content, and the digital content outlet may provide content digitally such as via a user interface presented by a computing device. Examples of these outlets may include television (linear content outlet), streaming services (persistent content outlet), and a web page (digital content outlet). The computing system 104 can execute the metadata file 118 or otherwise receive results from execution of the metadata file 118, and the results can be used by the computing system 104 to generate the performance and the measurement, etc., of the provided content 120 and/or of one or more content slots and/or potential digital content slots across linear content outlets, persistent content outlets, and/or digital content outlets. The computing system 104 can provide the performance and the measurement, etc. of the provided content 120 to the providing entity 102.

Figure 2:
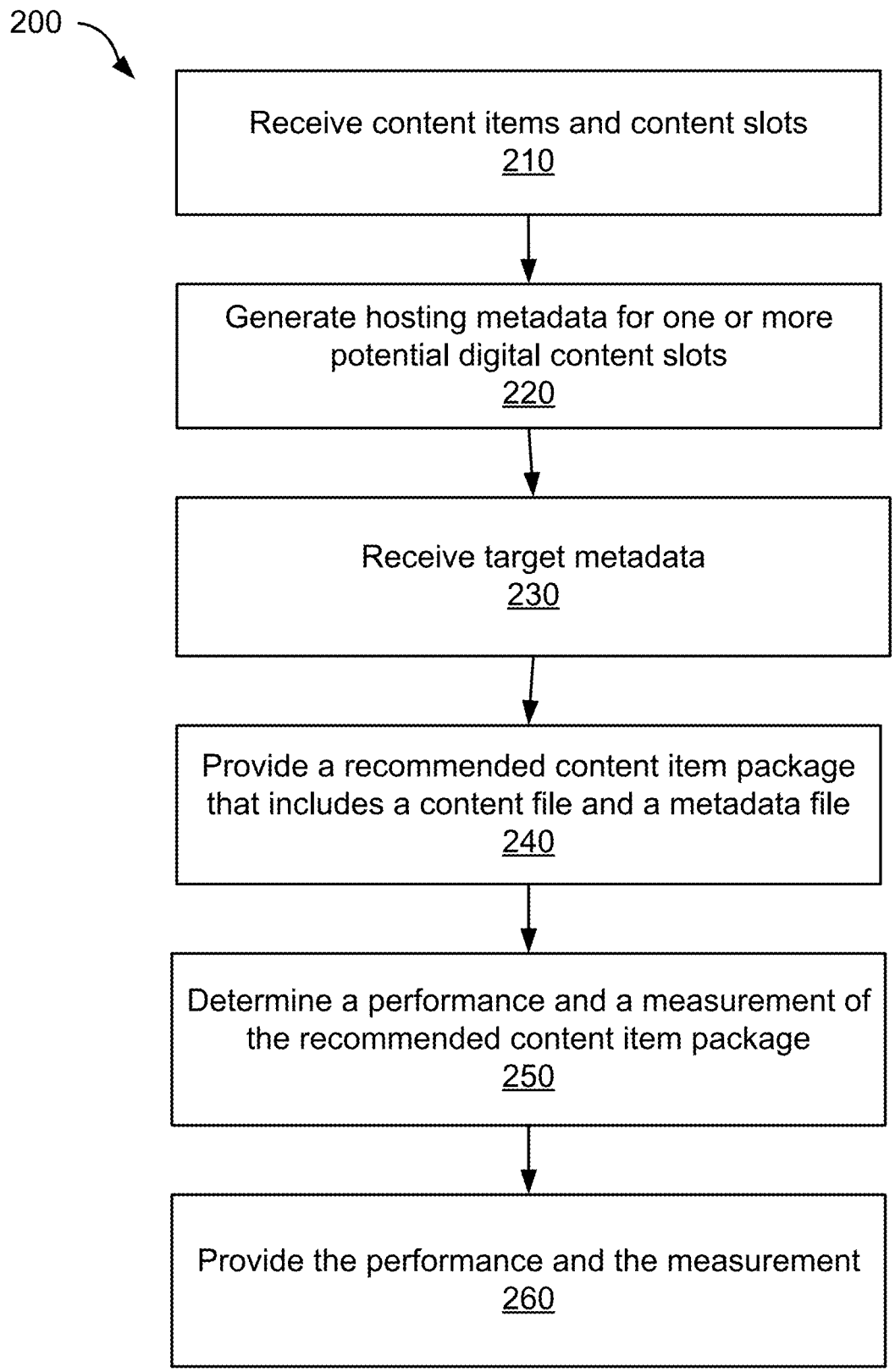
FIG. 2 is a flowchart of a process for tracking recommended content across multiple content outlets according to an embodiment.

Example of a Process for Tracking Recommended Content Across Multiple Content Outlets FIG. 2 is a flowchart of a process 200 for tracking recommended content across multiple content outlets according to an embodiment. The process 200 may be performed at least in part by any of the components described in the figures herein, for example, by any component of the data processing environment 100 or by the data processing environment 100, itself. The process 200 can begin at block 210, when the computing system 104 receives content items and content slots. In some examples, the computing system 104 can receive the content items and/or the content slots from a providing entity 102 such as a provider of goods and/or services, an entity configured to provide content via one or more content outlets, or the like. The content items and/or the content slots may include, or the computing system 104 may separately receive from the providing entity 102, content metadata associated with the content items, slot metadata associated with the content slot, or a combination thereof. The content metadata may include one or more tags that indicate a tone of the content items, may indicate a perception of the content items by a receiving entity, such as a user of a computing device, or may indicate other suitable information about the content items. The one or more tags may correspond to one or more user profiles that represent one or more users, such as a receiving entity. The slot metadata may include one or more tags that indicate a tone of text, figures, or other content surrounding or otherwise adjacent to the content slots, may indicate a perception of the text, figures, or other content surrounding or otherwise adjacent to the content slots by the receiving entity, or may indicate other suitable information about the text, figures, or other content surrounding or otherwise adjacent to the content slots. In some examples, the content slots may include content slots in one or more content outlets such as a linear content outlet, a persistent content outlet, and the like.

At block 220, the computing system 104 generates hosting metadata for one or more potential digital content slots. The computing system 104 may access one or more web pages via a communication network such as a local area network, a wide area network, and the like. The one or more web pages may include the one or more potential digital content slots, which may be or include content slots that can be used to provide the content items. The computing system 104 can analyze the one or more potential digital content slots to generate the hosting metadata. For example, the computing system 104 may analyze the text, images, other content, and the like surrounding or otherwise adjacent to a particular potential digital content slot to generate the hosting metadata corresponding to the particular potential digital content slot. The hosting metadata may indicate a tone of the text, images, or other content surrounding or otherwise adjacent to the potential digital content slots, may indicate a perception of the text, figures, or other content surrounding or otherwise adjacent to the potential digital content slots by the receiving entity, or may indicate other suitable information about the text, figures, or other content surrounding or otherwise adjacent to the potential digital content slots.

At block 230, the computing system 104 receives target metadata. In some examples, the computing system 104 receives the target metadata from the providing entity 102. In other examples, the computing system 104 can receive the target metadata from a remote computing device, can generate the target metadata based on a request received from the providing entity 102 and/or the remote computing device, or the like. The target metadata may include a requested tone, perception, or the like for potential content to be provided to the receiving entity. For example, the target metadata may indicate a tone of the potential content, may indicate a perception of the potential content by a receiving entity, such as a user of a computing device, or may indicate other suitable information about the potential content desired by the providing entity 102.

At block 240, the computing system 104 provides a recommended content item package that includes a content file and a metadata file. The computing system 104 can generate the recommended content item package based on various received or generated metadata, or tags included therein. For example, the computing system 104 can generate the recommended content item package based on the content metadata, the slot metadata, the hosting metadata, the target metadata, and the like. The computing system 104 can perform a comparison between the various metadata to generate the recommended content item package. For example, the computing system 104 may compare tags included in the target metadata to tags included in a combination of the content metadata, the slot metadata, and the hosting metadata to generate the recommended content item package. In this example, the computing system 104 may select or identify a recommended content item with content metadata having tags similar or identical to those of the target metadata. In another example, the computing system 104 may select or identify the recommended content item, and a recommended content slot or potential digital content slot, with a combination of content metadata, hosting metadata, and slot metadata that is similar or identical to the target metadata.

The computing system 104 can generate a content file and a metadata file based on the recommended content item, which may include a user interface, an advertisement, or other suitable content that can be provided to the receiving entity over multiple content outlets. The content file may include computer-executable instructions that, when executed, can provide the recommended content item to the receiving entity via a selected content slot or potential digital content slot. For example, the providing entity 102, the computing system 104, or a remote computing device can execute the content file to present the recommended content item in a particular content slot in a linear content outlet. In another example, the providing entity 102, the computing system 104, or a remote computing device can execute the content file to present the recommended content item in a particular potential digital content slot in a digital content outlet such as a web page.

The metadata file can be generated by the computing system 104 and can be used to track the recommended content item, to provide information about the recommended content item, and the like. The computing system 104, or other suitable computing devices such as a remote computing device or a computing device associated with the providing entity 102, can execute the metadata file to track or provide information about the recommended content item. For example, subsequent to a predetermined amount of time (or times), the computing system 104 can execute the metadata file to determine a number of times the recommended content was provided to the receiving entity, content slots or potential digital content slots in which the recommended content was provided to the receiving entity, results from providing the recommended content to the receiving entity, and the like. The results may involve whether or how the receiving entity interacted with one or more instances of the recommended content item, or other suitable results that can be provided by executing the metadata file.

Additionally, the metadata file may allow the computing system 104, or remote computing devices, to track the recommended content item across multiple content outlets. For example, the metadata file may accompany the content file and, upon execution of the content file, the metadata file may be updated to reflect the execution of the content file. Each content outlet, or a subset thereof, may cause the content file to be executes upon providing the recommended content to the receiving entity, and the metadata file can be adjusted substantially contemporaneously, for example to reflect information about providing the recommended content, with respect to the content file being executed. Upon a completion of providing the recommended content to the receiving entity, or upon a periodic or requested update regarding the recommended content, the metadata file can be executed to track a performance of the recommended content item, a measurement of the recommended content item, or the like. Additionally, the metadata file may persist across the content outlets and may not lose data when transmitted from a first content outlet to a second content outlet that is different than the first content outlet.

At block 250, the computing system 104 determines a performance and a measurement of the recommended content item package. The computing system 104 can execute the metadata file to track the recommended content item across multiple content outlets and to receive various information about the recommended content item being provided to the receiving entity. In some examples, the computing system 104 may receive results from executing the metadata file from a remote computing system. Executing the metadata file, or receiving the results from the remote computing device executing the metadata file, may cause the computing system 104 to receive data that can be used to determine the performance of the recommended content item package, the measurement of the recommended content item package, or a combination thereof.

The received data can indicate how or whether the receiving entity interacted with instances of the recommended content item, and the like. The computing system 104 can use the data to determine the performance, which may indicate a likelihood of the receiving entity interacting with, being receptive to, etc., the recommended content item. Additionally, the computing system 104 can use the data to determine the measurement, which may include an indication of similarity between the content metadata of the recommended content item and the slot metadata of content slots, or the hosting metadata of potential digital content slots, into which the recommended content item was inserted.

At block 260, the computing system 104 provides the performance and the measurement of the recommended content item package. In some examples, the computing system 104 may provide the performance of the recommended content item package and/or the measurement of the content item package to the providing entity 102. In a particular example, the computing system 104 may provide the performance of the recommended content item package to the providing entity 102, and the computing system 104 may use the measurement of the recommended content item package to improve subsequent operations to generate subsequent recommended content item packages. The computing system 104 may transmit the performance of the recommended content item package to the providing entity 102 to facilitate decisions by the providing entity 102 with respect to subsequent content items. The performance of the recommended content item package may inform the providing entity 102 about performance of the recommended content across multiple content outlets.

Figure 3:
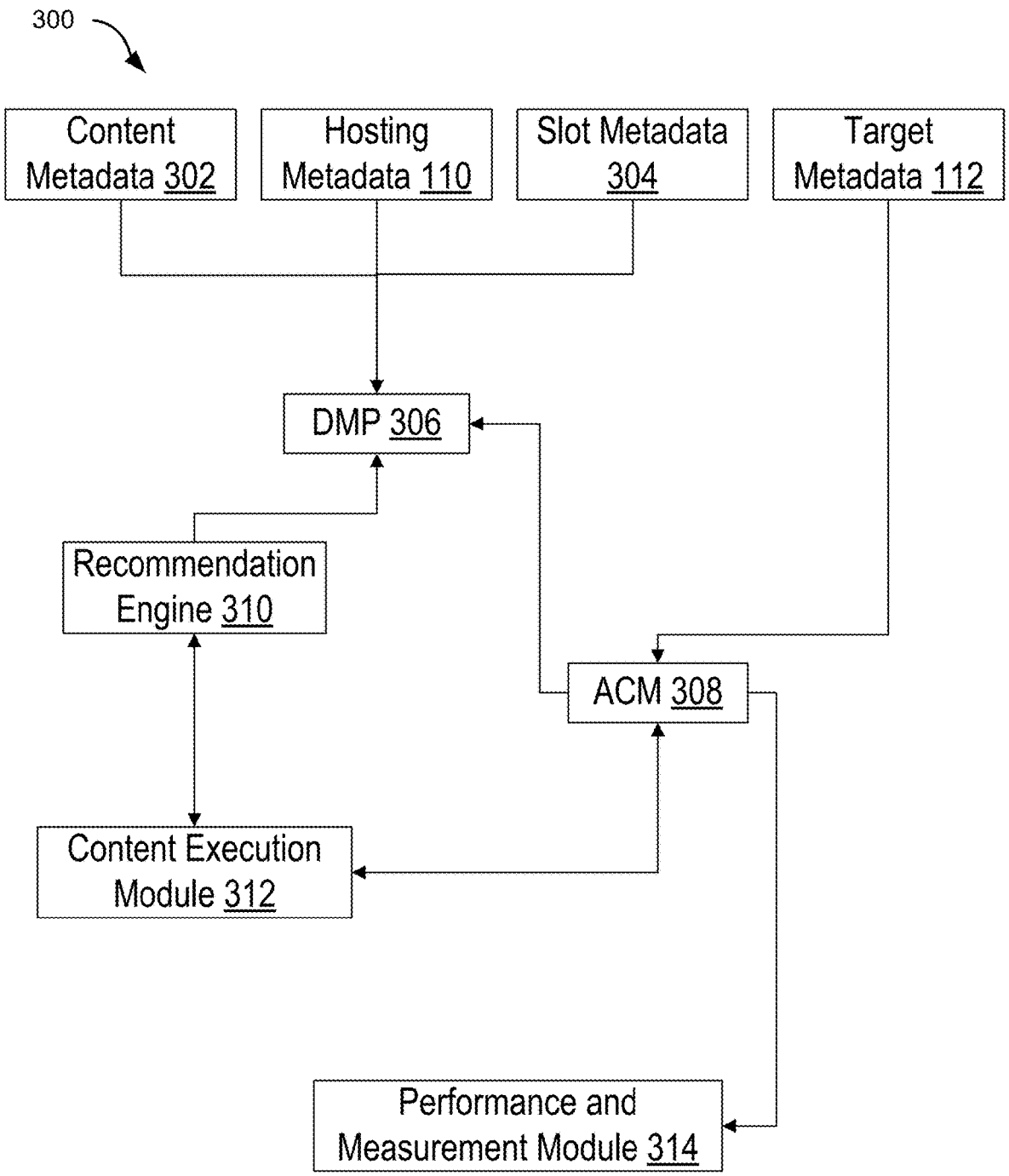
FIG. 3 is an example of a data flow diagram for tracking recommended content across multiple content outlets according to an embodiment.

Examples of Data Flow for Tracking Recommended Content Across Multiple Content Outlets FIG. 3 is an example of a data flow diagram 300 for tracking recommended content across multiple content outlets according to an embodiment. As illustrated, the data flow diagram 300 may include various different types of metadata. For example, the data flow diagram 300 may begin with content metadata 302, hosting metadata 110, slot metadata 304, and target metadata 112. The content metadata 302 may correspond to content items, the hosting metadata 110 may correspond to potential digital content slots, the slot metadata 304 may correspond to content slots (e.g., in linear content outlets, persistent content outlets, and the like), and the target metadata 112 may correspond to potential or desired content items. In some examples, the various different types of metadata may each indicate a tone, a potential reception by a receiving entity, and the like for the corresponding content items, content slots, etc. Additionally, the content metadata 302 may be provided or otherwise generated by a providing entity 102, the hosting metadata 110 may be provided or otherwise generated by the computing system 104, the slot metadata 304 may be provided or otherwise generated by the providing entity 102, and/or the target metadata 112 may be provided or otherwise generated by the providing entity 102.

The content metadata 302, the hosting metadata 110, and the slot metadata 304 may be transmitted to a data management platform (DMP) 306, and the target metadata 112 may be transmitted to an assumptions change manager (ACM) 308. The DMP 306 may be communicatively coupled with a recommendation engine 310, and the ACM 308 may be communicatively coupled with a content execution module 312. The DMP 306 may manage data flowing with respect to the computing system 104 or otherwise for tracking the recommended content item across multiple content outlets. In some examples, the DMP 306 can be or include a searchable data repository that can store the various different types of metadata and/or the corresponding content items, content slots, potential digital content slots, and the like. The ACM 308 may control account information relating to the providing entity 102, the receiving entity, or other entities associated with the recommended content item. For example, the ACM 308 may be configured to identify the receiving entity, the providing entity 102, or the accounts thereof and can be used to transmit the recommended content item package to the providing entity 102 or other remote computing device. The DMP 306 and/or the ACM 308 may perform other operations for facilitating generation of the recommended content item package, execution of the recommended content item package, and the like.

The DMP 306 may receive and store the content metadata 302, the hosting metadata 110, and the slot metadata 304 for subsequent use. In some examples, the DMP 306 can periodically, or in response to a request from the providing entity 102, etc., access or receive the content metadata 302, the hosting metadata 110, and/or the slot metadata 304. Additionally, the providing entity 102 may transmit the target metadata 112 to the computing system 104, for example via the ACM 308. The ACM 308 can receive the target metadata 112 and can communicate with the content execution module 312 to provide content to the receiving entity. The content execution module 312, which may be included in the computing system 104, in a remote computing device, or the like, can communicate with the recommendation engine 310 to generate the recommended content item package.

The recommendation engine 310 may be included in or otherwise executed by the computing system 104, and, upon execution, the recommendation engine 310 can submit one or more requests to the DMP 306. For example, the one or more requests can include a query or search request for the DMP 306 to return the content metadata 302, the hosting metadata 110, and the slot metadata 304, and other information that can be used to generate the recommended content item package. The recommendation engine 310 can use the data received from the DMP 306 to determine the desired content item, the desired content slot, the desired potential digital content slot, or the like for generating the recommended content item package. In some examples, the recommendation engine 310 can identify the desired content metadata and can submit a subsequent query for one or more content items stored in the DMP 306 that correspond to the desired content metadata. Additionally, in some examples, the recommendation engine 310 can identify the desired slot metadata and/or hosting metadata and can submit the subsequent query for one or more content slots and/or one or more potential digital content slots, or indications thereof, stored in the DMP 306 that correspond to the desired slot metadata and/or hosting metadata.

Based on the one or more queries submitted to the DMP 306, the recommendation engine can generate the recommended content item package. For example, the recommendation engine 310 can generate a content file that include a recommended content item and can generate a metadata file corresponding to the content file that can track the recommended content item across multiple content outlets. In some examples, the recommended content item included in the content file may be characterized by content metadata that corresponds to (e.g., that is consistent with, that is similar or identical to, etc.) the target metadata 112. The recommendation engine 310 can transmit the recommended content item package to the content execution module 312, which can execute the recommended content item package or can transmit the recommended content item package to a remote computing device for execution. Executing the recommended content item package may involve executing the content file to provide the recommended content item to the receiving entity via one or more content slots and/or one or more potential digital content slots across multiple content outlets.

The content execution module 312 may generate, or receive from the remote computing device, execution data from the execution of the recommended content item package. For example, the recommended content item may be inserted into a set of content slots and a set of potential digital content slots, and results from the insertion may be received by the content execution module 312. In some examples, the results may include impression data, reception of the recommended content item, interaction (e.g., by the receiving entity) with the recommended content item, and the like. The content execution module 312 may provide the results to the ACM 308, which may aggregate the results, analyze the results, or perform other operations for refining the results. In some examples, the ACM 308 may compile the results received from the content execution module 312 and transmit the compiled results to a performance and measurement module 314.

The performance and measurement module 314 may be included in or executed by the computing system 104. The performance and measurement module 314 may generate a performance report, a measurement report, other metrics relating to the recommended content item package (or any component thereof), or a combination thereof. For example, the performance and measurement module 314 may generate a performance report to transmit to the providing entity 102, may generate a measurement report to transmit to the providing entity 102 and/or the DMP 306, or the like. The performance report may include an indication of a likelihood of the receiving entity interacting with, being receptive to, etc., the recommended content item provided via the recommended content item package. Additionally, the measurement report may include an indication of similarity between the content metadata of the recommended content item and the slot metadata of content slots, or the hosting metadata of potential digital content slots, into which the recommended content item was inserted. The performance report, the measurement report, and/or the other metrics generated by the performance and measurement module 314 may include other indications of performance or measurement of the recommended content item provided to the receiving entity.

In some examples, the performance report, the measurement report, and/or the other metrics may provide tracking information about the recommended content item package, or any component thereof, across multiple content outlets. The performance report, the measurement report, and/or the other metrics may provide insights regarding how or whether the recommended content item was interacted with in multiple content outlets, how the receiving entity perceived or reacted to the recommended content item across the multiple content outlets, or the like. In a particular example, the metadata file can be adjusted each instance of, or otherwise periodically with respect to, the recommended content item being provided to the receiving entity.

Figure 4:
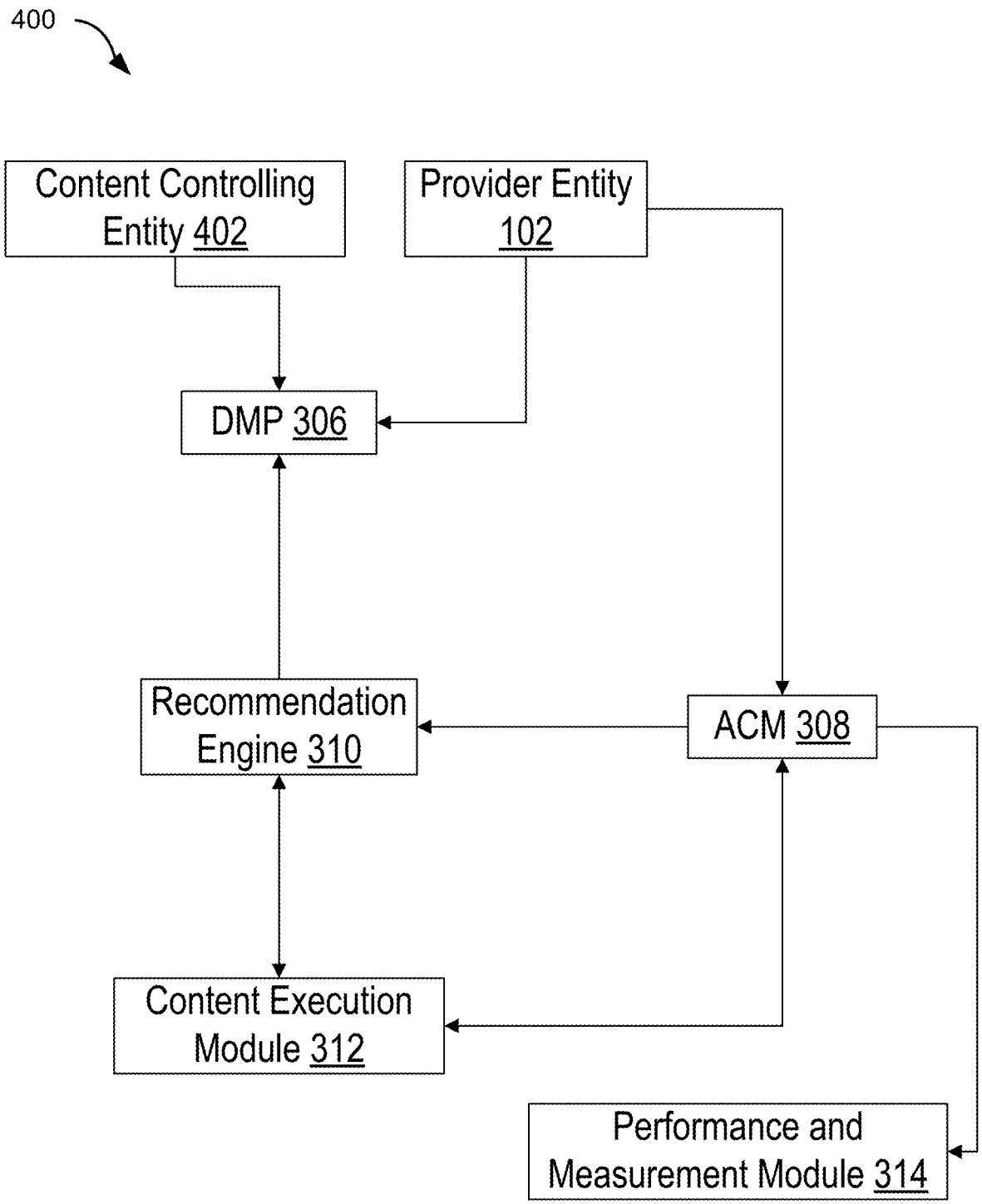
FIG. 4 is another example of a data flow diagram for tracking recommended content across multiple content outlets according to an embodiment.

FIG. 4 is another example of a data flow diagram 400 for tracking recommended content across multiple content outlets according to an embodiment. As illustrated, the data flow diagram 400 may involve the providing entity 102 and a content controlling entity 402. The providing entity 102 may include a provider of good and/or services, and the content controlling entity 402 may include an entity that generates, distributes, or otherwise controls content items, for example on behalf of the providing entity 102 or other entities. The providing entity 102 and the content controlling entity 402 may each be communicatively coupled with the DMP 306, for example via the Internet or other communication network. Additionally, the providing entity 102 may be communicatively coupled with the ACM 308.

The providing entity 102 may generate and provide the DMP 306 with content metadata 302 corresponding to one or more content items, and the DMP 306 may store the content metadata 302, the corresponding one or more content items, and other information received from the providing entity 102 in a searchable data repository. Additionally or alternatively, the content controlling entity 402 may generate and provide the DMP 306 with slot metadata 304, hosting metadata 110, and corresponding indications of content slots and potential digital content slots. The DMP 306 can store the slot metadata 304, the hosting metadata 110, and the corresponding indications of content slots and potential digital content slots, and other information received from the content controlling entity 402, in the searchable data repository. Additionally, the providing entity 102 may generate and provide the ACM 308 with target metadata 112 corresponding to one or more potential content items desired to be provided to the receiving entity. The ACM 308 can use the target metadata 112 to initiate one or more operations to generate the recommended content item package.

The ACM 308 can use the target metadata 112 to transmit a request to the recommendation engine 310 to generate the recommended content item package. The request may include the target metadata 112, which may include campaign characteristics, metadata for potential content, and the like, and the recommendation engine 310 can use the request to generate and submit a query to the DMP 306 to receive data for generating the recommended content item package. The DMP 306 can transmit requested data to the recommendation engine 310 to generate the recommended content item package. The requested data can include one or more content items and content metadata, one or more content slots and slot metadata, one or more potential digital content slots and hosting metadata, and the like. The recommendation engine 310, based on the requested data and based on a comparison or other analysis involving the content metadata, the slot metadata, the hosting metadata, the target metadata, and/or other data or metadata can generate the recommended content item package, which may include a content file, a metadata file, and the like. The recommendation engine 310 can transmit the recommended content item package to the content execution module 312, which can execute the recommended content item package to provide one or more recommended content items to the receiving entity.

The content execution module 312 can receive execution data in response to providing the one or more recommended content items to the receiving entity. For example, the execution data can include impression data, reception of the recommended content item, interaction (e.g., by the receiving entity) with the recommended content item, and the like. In some examples, the content execution module 312 can transmit the execution data to the ACM 308, which can compile or otherwise analyze the execution data. In a particular example, the ACM 308 compiles and parses the execution data, and the ACM 308 transmits the execution data to the performance and measurement module 314. The performance and measurement module 314 can generate a performance report, a measurement report, and the like based on the execution data provided by the ACM 308. In some examples, the performance and measurement module 314 may parse the received execution data to determine a set of instances of the recommended content item being provided to the receiving entity. For example, and for each instance, the performance and measurement module 314 may determine an instance identifier, a content slot identifier, a content item identifier, a target identifier (e.g., associated with the target metadata), and reception data, interaction data, and the like relating to the instance.

The performance and measurement module 314 may generate the performance report and the measurement report based on the parsed execution data. The performance report may include an indication of a likelihood of the receiving entity interacting with, being receptive to, etc., the recommended content item provided via the recommended content item package. Additionally, the measurement report may include an indication of similarity between the content metadata of the recommended content item and the slot metadata of content slots, or the hosting metadata of potential digital content slots, into which the recommended content item was inserted. The performance report and the measurement report may track performances, measurements, and the like of the recommended content item package, or any component thereof, across multiple content outlets. The performance report, the measurement report, and/or the other metrics generated by the performance and measurement module 314 may include other indications of performance or measurement of the recommended content item provided to the receiving entity. In some examples, the performance and measurement module 314 can provide the performance report and/or the measurement report to the providing entity 102, the content controlling entity 402, and/or other computing devices such as the computing system 104 or any user thereof.

Figure 5:
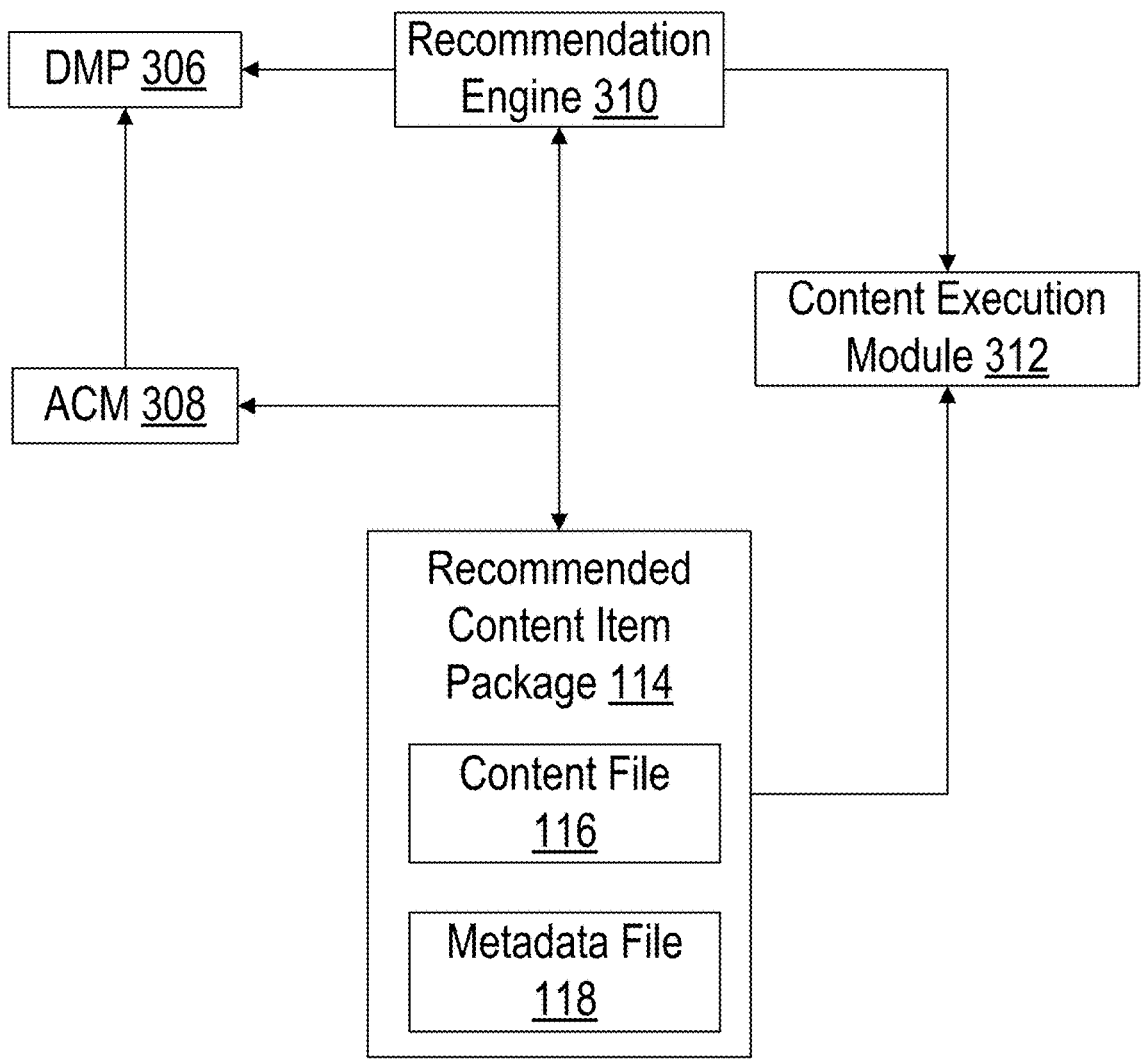
FIG. 5 is another example of a data flow diagram for tracking recommended content across multiple content outlets according to an embodiment.

FIG. 5 is another example of a data flow diagram 500 for tracking recommended content across multiple content outlets according to an embodiment. As illustrated, the recommendation engine 310 may be communicatively coupled with the DMP 306, the ACM 308, and the content execution module 312. The recommendation engine 310 may receive, from the content execution module 312, a request for content recommendation, which may originate from the providing entity 102 or other entity configured to submit the request for content recommendation. The recommendation engine 310 may receive the request, which may include target metadata and other target metrics for the recommended content, and the recommendation engine 310 can generate a query, a subquery, a nested query, or the like to submit to the DMP 306, to the ACM 308, or to a combination thereof. For example, the recommendation engine 310 can submit a query to the ACM 308 to request content items and content metadata, and the like. Additionally or alternatively, the recommendation engine 310 can submit a query to the DMP 306 to request content slots and slot metadata, potential digital content slots and hosting metadata, and the like.

The recommendation engine 310 can receive, in response to submitting the queries, the content metadata, the slot metadata, the hosting metadata, and the like. In some examples, the queries submitted by the recommendation engine 310 may cause the DMP 306 to return one or more content items, one or more indications of content slots, one or more indications of potential digital slots, and the like that correspond to the target metadata. Corresponding to the target metadata may involve the content metadata of the requested content item being most similar to the target metadata, or may involve a combination of the received content metadata, the received slot metadata, and the received hosting metadata being most similar to the target metadata. In response to receiving the content items, the content slots, the potential digital slots, and the like, from the DMP 306, the recommendation engine 310 may generate the recommended content item package 114 using the received content items, which may be a recommended content item.

The recommended content item package 114 may include a content file 116, a metadata file 118, and other suitable components for the recommended content item package 114. The recommendation engine 310 may generate machine-executable program code that, when executed by a computing device, provides the recommended content item. The recommendation engine 310 can generate the content file 116 to include the machine-executable program code for providing the recommended content item. Additionally, the recommendation engine 310 can generate machine-executable program code that, upon execution by the computing device, tracks the recommended content item. The recommendation engine 310 can generate the metadata file 118 to include the machine-executable program code for tracking the recommended content item. In some examples, the recommendation engine 310 can generate the metadata file 118 to be a hidden file, or other type of file not executable by a content providing entity of a content outlet, that can automatically execute in response to the content file 116 executing. In a particular example, the metadata file 118 can be automatically executed, in response to executing the content file 116 to provide the recommended content item, to generate one or more metrics about the recommended content item. The one or more metrics can include instances of inserting the recommended content item into content slots and/or potential digital content slots, interactions by the receiving entity with the recommended content item, and the like.

The recommendation engine 310 can provide the recommended content item package 114 to the content execution module 312, which can execute the recommended content item package 114, can transmit the recommended content item package 114 to a remote computing device for execution, or the like. The recommended content item package 114 can be executed to provide the recommended content item to the receiving entity, and the metadata file 118 can be executed, for example subsequently, periodically, or in response to a request from the providing entity 102, by the computing system 104 to track the recommended content item package 114 across multiple content outlets. Tracking the recommended content item package 114 can involve the computing system 104, or other suitable computing devices, generating the performance report and/or the measurement report for the recommended content item package 114.

Illustrative Systems

Figure 6:
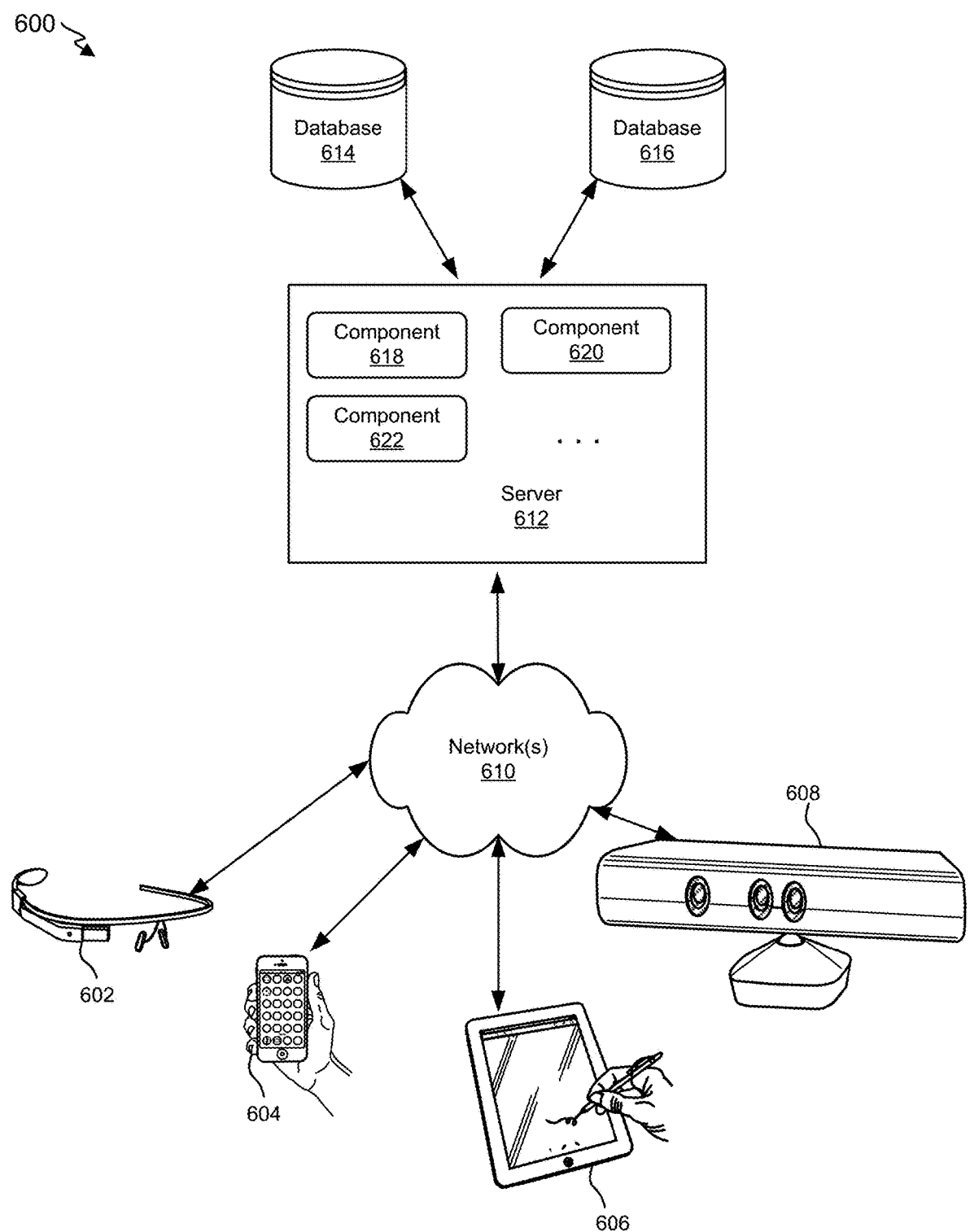
FIG. 6 is a simplified diagram illustrating a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network(s) 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of distributed system 600 are shown as being implemented on server 612. In other embodiments, one or more of the components of distributed system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. In some embodiments, the client computing devices can be special purpose computers that may be programmed or otherwise designed to perform a defined function via an embedded system, or the like, to perform the defined function independent of other tasks. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, special purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely. In one set of embodiments, databases 614 and 616 may include relational databases, such as databases provided by Oracle, that are adapted to store, update, and retrieve data in response to SQL-formatted commands.

Figure 7:
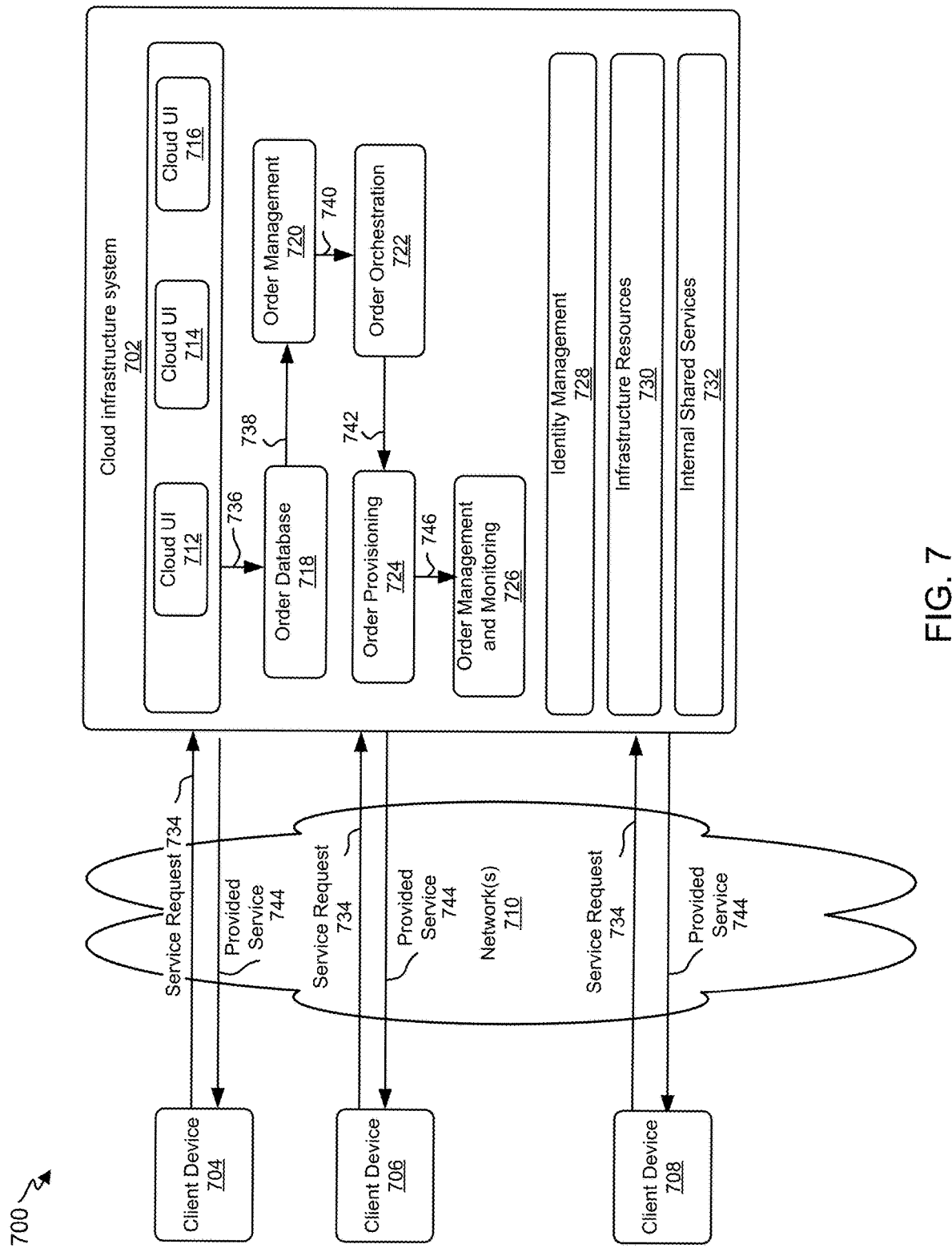
FIG. 7 is a simplified block diagram illustrating one or more components of a system environment according to an embodiment.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 710.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can be scaled based on the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, reliable, highly available, and secure manner. The database service offerings may involve computing/storage resources being provisioned and configured for specialized use as needed, and the resources being un-provisioned in scenarios where the resources are not needed or not expected to be needed within a timeframe. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and customizable services that can authenticate users and adapt to diverse needs of diverse organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users, and the resources can be re-allocated based on demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, special purpose computers, specialized server computers, server farms, server clusters, or any other appropriate arrangement and/or combination.

In operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of processes associated with each order and applies logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
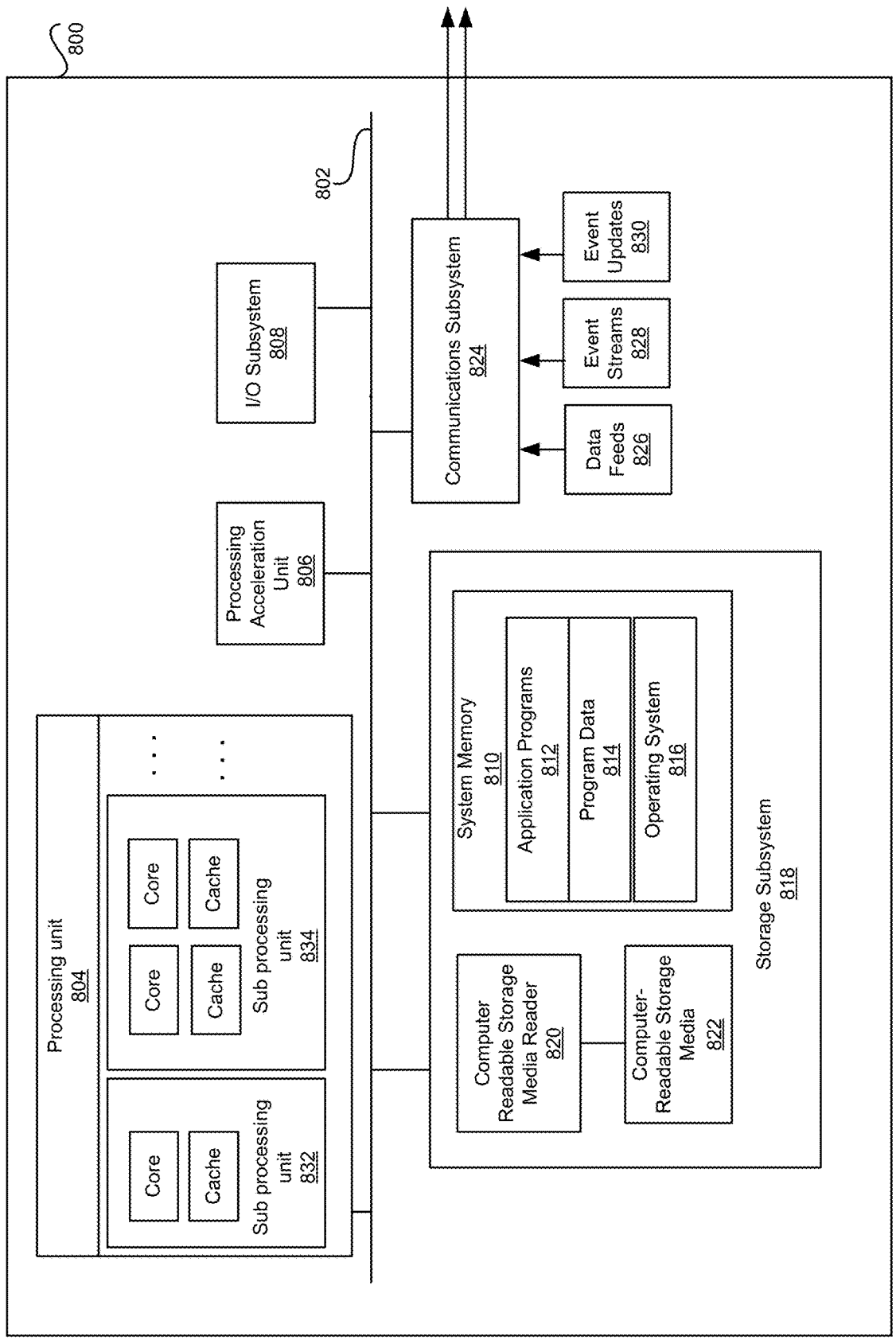
FIG. 8 illustrates an exemplary computer system, in which various embodiments of the present invention may be implemented.

FIG. 8 illustrates an example of a computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Non-Limiting Example of Techniques Described Herein

In some examples, a providing entity may be a service provider, a receiving entity may be a user (e.g., of a computing device), and a content providing entity may be a moderator such as an entity that controls a respective content outlet. The service provider may transmit content items and content metadata to a system for recommending content to provide to the user. The content items may include interactive features, messages from the service provider, and the like. The content metadata may include tags that indicate a tone of the respective content items. The tags may correspond to tags of a user profile that represent a personality, general preferences, or the like of the user. Some examples of the tags can include activity, aggressiveness, responsibility, emotionality, simplicity, and the like. Other examples of tags can include extraversion, agreeableness, conscientiousness, emotional stability, openness, and the like.

Additionally, the service provider can transmit content slots and slot metadata to the system. The content slots may represent places, times, or the like in which content items can be inserted to be provided to the user. An example of a content slot can include a particular time range on a particular television channel, though other examples of content slots are possible. The slot metadata may include tags that indicate a tone of content adjacent to the respective content slots. The tags may represent a personality, general preferences, or the like users that may be interested in the content adjacent to the respective content slots.

The system can access one or more web pages to identify one or more potential digital content slots. The digital content slots may be configured to receive the content items to be provided via the respective web pages. The system can generate hosting metadata for the potential digital content slots by analyzing the text, images, and the like surrounding the respective digital content slots. The hosting metadata may include tags that indicate a tone of the text, images, and the like surrounding the respective potential digital content slots. The tags may represent a personality, general preferences, or the like users that may be interested in the text, images, and the like surrounding the respective potential digital content slots.

The service provider may additionally transmit target metadata to the system. The target metadata may include tags indicating a desired content item to provide to the user. The system may use the target metadata to generate a query to a data repository storing the content items and content metadata, the content slots and slot metadata, and the potential digital content slots and the hosting metadata. The query may cause the data repository to return a recommended content item based on comparing tags from the target metadata to tags of the content metadata. The system may generate a recommended content item package based on the recommended content item, and the recommended content item package may include a content file and a metadata file coupled to the content file.

The content file may include program code that, when executed, can insert the recommended content item into a particular content slot or potential digital content slot. The metadata file may be a hidden file that includes program code that automatically executes, in response to executing the content file, to track the recommended content item. Tracking the recommended content item can involve (i) determining a number of instances of the recommended content item being inserted into content slots, potential digital content slots, or a combination thereof, and (ii) determining how often the user interacted with the recommended content item.

Based on executing the metadata file, the system can generate a performance report and a measurement report. The system can transmit the performance report to the service provider, and the system can use the measurement report to enhance a recommendation engine used to generate the recommended content item package. The performance report may include an indication of a likelihood of the receiving entity interacting with, being receptive to, etc., the recommended content item provided via the recommended content item package. The measurement report may include an indication of similarity between the first metadata of the recommended content item and the second metadata of content slots, or the third metadata of potential digital content slots, into which the recommended content item was inserted.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   receiving a plurality of content items from a content providing entity;
   transmitting the plurality of content items to a first receiving entity of a plurality of receiving entities associated with a user via one or more of a plurality of content outlets including: a linear content outlet, a persistent content outlet, and a digital content outlet, wherein:
      each content item of the plurality of content items is characterized with first metadata that corresponds to a first context of each of the content item and a plurality of content slots; and
      each content slot of the plurality of content slots is configured to receive at least one content item of the plurality of content items, each content slot of the plurality of content slots is characterized by second metadata that is different than the first metadata, and the second metadata corresponds to a second context of content items adjacent to respective content slots of the plurality of content slots;
   analyzing text and/or one or more images adjacent to one or more potential digital content slots on a webpage;
   classifying based on the analysis the text and/or one or more images adjacent to the one or more potential digital content slots on the webpage into one or more categories;
   generating, based on the classification, third metadata for the one or more potential digital content slots, the third metadata being different than the first metadata and the second metadata, and the third metadata corresponding to the one or more categories of the text and/or one or more images adjacent to the one or more potential digital content slots;
   receiving from the content providing entity, fourth metadata that indicates a third context, wherein the third context corresponds to a potential content to provide to the first receiving entity on behalf of the content providing entity;
   determining a recommended content item from the plurality of content items based on matching the first context of each of the content item with the third context, wherein a context of the recommended content item matches the third context;

identifying a recommended content slot of the plurality of content slots and a recommended potential digital content slot of the one or more potential digital content slots, based on the third context;

generating a recommended content item package, using the recommended content item, the recommended content slot of the plurality of content slots, and the recommended potential digital content slot of the one or more potential digital content slots, for the first receiving entity associated with the user;

providing the recommended content item package to the first receiving entity associated with the user, wherein:
the recommended content item package represents the recommended content item having first metadata corresponding to the fourth metadata, and
the recommended content item package comprises:
a content file that, when executed, provides the recommended content item to the first receiving entity; and
a metadata file coupled to the content file, the metadata file when executed, provides details about and tracks, instances in which the recommended content item is provided via the recommended content slot or the recommended potential digital content slot, wherein the metadata persists data when transmitted from one of the first receiving entity using a content outlet of the plurality of content outlets to a second receiving entity using another content outlet plurality of content outlets;

determining a performance of the recommended content item package and a measurement of the recommended content item package by executing the metadata file to track the content file across the plurality of receiving entities receiving the recommended content item package via one or more of the linear content outlet, the persistent content outlet, and the digital content outlet wherein the metadata file is a hidden file that is automatically executed, in response to executing the content file, to track the content file across one or more first content outlets of the plurality of content outlets and one or more second content outlets of the plurality of content outlets that are disjunctive; and availing the performance and the measurement to the content providing entity.

2. The computer-implemented method of claim 1, wherein:
the plurality of content slots are provided by one or more first content outlets of the plurality of content outlets,
the one or more potential digital content slots are provided by one or more second content outlets of the plurality of content outlets, and
the one or more first content outlets of the plurality of content outlets are disjunctive with respect to the one or more second content outlets of the plurality of content outlets.

3. The computer-implemented method of claim 2, further comprising executing the metadata file to receive the details about the recommended content item, wherein:
the details comprise data from the one or more first content outlets of the plurality of content outlets and the one or more second content outlets of the plurality of content outlets, and
the metadata file is executed to track the recommended content item across the one or more first content outlets of the plurality of content outlets and the one or more second content outlets of the plurality of content outlets.

4. The computer-implemented method of claim 1, wherein:
the first metadata further indicates a likelihood of the receiving entity interacting with a corresponding content item of the plurality of content items and a tone of the corresponding content item of the plurality of content items;
the second metadata further indicates a tone of content surrounding a corresponding content slot of the plurality of content slots;
the third metadata indicates further a tone of content surrounding a corresponding potential digital content slot of the plurality of content slot; and
the fourth metadata further indicates a likelihood of the receiving entity interacting with a corresponding potential content item and a tone of the corresponding potential content item.

5. The computer-implemented method of claim 1, further comprising identifying the recommended content item based on comparing a combination of the first metadata, the second metadata, and the third metadata to the fourth metadata, wherein comparing the combination of the first metadata, the second metadata, and the third metadata to the fourth metadata comprises:
determining that a particular subset of the first metadata corresponding to the recommended content item is most similar to the fourth metadata; and
accessing, via a query to a data repository including the first metadata, the recommended content item to generate the recommended content item package.

6. The computer-implemented method of claim 1, wherein:
the performance includes a performance report provided to the content providing entity,
the performance report includes an indication of how frequently the receiving entity interacted with the recommended content item and a number of instances the recommended content item was inserted into one or more content slots or one or more potential digital content slots of the plurality of content slots,
the measurement includes a measurement report used to adjust the recommended content item package, and
the measurement report includes an indication of a similarity between the first metadata of each of the content item and the second metadata of content slots, or the third metadata of potential digital content slots, into which the recommended content item was inserted.

7. A computer-program product tangibly embodied in a non-transitory machine-readable storage medium, including instructions configured to cause one or more data processors to perform a set of actions including:
receiving a plurality of content items from a content providing entity;
transmitting the plurality of content items to a first receiving entity of a plurality of receiving entities associated with a user via one or more of a plurality of content outlets including: a linear content outlet, a persistent content outlet, and a digital content outlet, wherein:
each content item of the plurality of content items is characterized with first metadata that corresponds to a first context of each of the content item and a plurality of content slots; and
each content slot of the plurality of content slots is configured to receive at least one content item of the plurality of content items, each content slot of the plurality of content slots is characterized by second metadata that is different than the first metadata, and the second metadata corresponds to a second context of content items adjacent to respective content slots of the plurality of content slots;

analyzing text and/or one or more images adjacent to one or more potential digital content slots on a webpage;

classifying based on the analysis the text and/or one or more images adjacent to the one or more potential digital content slots on the webpage into one or more categories;

generating, based on the classification, third metadata for the one or more potential digital content slots, the third metadata being different than the first metadata and the second metadata, and the third metadata corresponding to the one or more categories of the text and/or one or more images adjacent to the one or more potential digital content slots;

receiving from the content providing entity, fourth metadata that indicates a third context, wherein the third context corresponds to a potential content to provide to the first receiving entity on behalf of the content providing entity;

determining a recommended content item from the plurality of content items based on matching the first context of each of the content item with the third context, wherein a context of the recommended content item matches the third context;

identifying a recommended content slot of the plurality of content slots and a recommended potential digital content slot of the one or more potential digital content slots, based on the third context;

generating a recommended content item package, using the recommended content item, the recommended content slot of the plurality of content slots, and the recommended potential digital content slot of the one or more potential digital content slots, for the first receiving entity associated with the user;

providing the recommended content item package to the first receiving entity associated with the user, wherein:
the recommended content item package represents the recommended content item having first metadata corresponding to the fourth metadata, and
the recommended content item package comprises:
a content file that, when executed, provides the recommended content item to the first receiving entity; and
a metadata file coupled to the content file, the metadata file when executed, provides details about and tracks, instances in which the recommended content item is provided via the recommended content slot or the recommended potential digital content slot, wherein the metadata persists data when transmitted from one of the first receiving entity using a content outlet of the plurality of content outlets to a second receiving entity using another content outlet plurality of content outlets;

determining a performance of the recommended content item package and a measurement of the recommended content item package by executing the metadata file to track the content file across the plurality of receiving entities receiving the recommended content item package via one or more of the linear content outlet, the persistent content outlet, and the digital content outlet wherein the metadata file is a hidden file that is automatically executed, in response to executing the content file, to track the content file across one or more first content outlets of the plurality of content outlets and one or more second content outlets of the plurality of content outlets that are disjunctive; and availing the performance and the measurement to the content providing entity.

8. The computer-program product of claim 7, wherein:
the plurality of content slots are provided by one or more first content outlets of the plurality of content outlets,
the one or more potential digital content slots are provided by one or more second content outlets of the plurality of content outlets, and
the one or more first content outlets of the plurality of content outlets are disjunctive with respect to the one or more second content outlets of the plurality of content outlets.

9. The computer-program product of claim 8, wherein the set of actions further includes executing the metadata file to receive the details about the recommended content item, wherein:
the details comprise data from the one or more first content outlets of the plurality of content outlets and the one or more second content outlets of the plurality of content outlets, and
the metadata file is executed to track the recommended content item across the one or more first content outlets of the plurality of content outlets and the one or more second content outlets of the plurality of content outlets.

10. The computer-program product of claim 7, wherein:
the first metadata further indicates a likelihood of the receiving entity interacting with a corresponding content item of the plurality of content items and a tone of the corresponding content item of the plurality of content items;
the second metadata further indicates a tone of content surrounding a corresponding content slot of the plurality of content slots;
the third metadata indicates further a tone of content surrounding a corresponding potential digital content slot of the plurality of content slot; and
the fourth metadata further indicates a likelihood of the receiving entity interacting with a corresponding potential content item and a tone of the corresponding potential content item.

11. The computer-program product of claim 7, wherein the set of actions further includes identifying the recommended content item based on comparing a combination of the first metadata, the second metadata, and the third metadata to the fourth metadata, wherein comparing the combination of the first metadata, the second metadata, and the third metadata to the fourth metadata comprises:
determining that a particular subset of the first metadata corresponding to the recommended content item is most similar to the fourth metadata; and
accessing, via a query to a data repository including the first metadata, the recommended content item to generate the recommended content item package.

12. The computer-program product of claim 7, wherein:
the performance includes a performance report provided to the content providing entity,
the performance report includes an indication of how frequently the receiving entity interacted with the recommended content item and a number of instances the recommended content item was inserted into one or more content slots or one or more potential digital content slots of the plurality of content slots, the measurement includes a measurement report used to adjust the recommended content item package, and the measurement report includes an indication of a similarity between the first metadata of each of the content item and the second metadata of content slots, or the third metadata of potential digital content slots, into which the recommended content item was inserted.

13. A system comprising:

one or more data processors; and a non-transitory computer readable-storage medium containing instructions which, when executed on the one or more data processors, cause the one or more data processors to perform a set of actions including:

receiving a plurality of content items from a content providing entity;

transmitting the plurality of content items to a first receiving entity of a plurality of receiving entities associated with a user via one or more of a plurality of content outlets including: a linear content outlet, a persistent content outlet, and a digital content outlet, wherein:

each content item of the plurality of content items is characterized with first metadata that corresponds to a first context of each of the content item and a plurality of content slots; and each content slot of the plurality of content slots is configured to receive at least one content item of the plurality of content items, each content slot of the plurality of content slots is characterized by second metadata that is different than the first metadata, and the second metadata corresponds to a second context of content items adjacent to respective content slots of the plurality of content slots;

analyzing, by the computing device, text and/or one or more images adjacent to one or more potential digital content slots on a webpage;

classifying based on the analysis the text and/or one or more images adjacent to the one or more potential digital content slots on the webpage into one or more categories;

generating, based on the classification, third metadata for the one or more potential digital content slots, the third metadata being different than the first metadata and the second metadata, and the third metadata corresponding to the one or more categories of the text and/or one or more images adjacent to the one or more potential digital content slots;

receiving from the content providing entity, fourth metadata that indicates a third context, wherein the third context corresponds to a potential content to provide to the first receiving entity on behalf of the content providing entity;

determining a recommended content item from the plurality of content items based on matching the first context of each of the content item with the third context, wherein a context of the recommended content item matches the third context;

identifying a recommended content slot of the plurality of content slots and a recommended potential digital content slot of the one or more potential digital content slots, based on the third context;

generating a recommended content item package, using the recommended content item, the recommended content slot of the plurality of content slots, and the recommended potential digital content slot of the one or more potential digital content slots, for the first receiving entity associated with the user;

providing the recommended content item package to the first receiving entity associated with the user, wherein:

the recommended content item package represents the recommended content item having first metadata corresponding to the fourth metadata, and the recommended content item package comprises:

a content file that, when executed, provides the recommended content item to the first receiving entity; and a metadata file coupled to the content file, the metadata file when executed, provides details about and tracks, instances in which the recommended content item is provided via the recommended content slot or the recommended potential digital content slot, wherein the metadata persists data when transmitted from one of the first receiving entity using a content outlet of the plurality of content outlets to a second receiving entity using another content outlet plurality of content outlets;

determining a performance of the recommended content item package and a measurement of the recommended content item package by executing the metadata file to track the content file across the plurality of receiving entities receiving the recommended content item package via one or more of the linear content outlet, the persistent content outlet, and the digital content outlet, wherein the metadata file is a hidden file that is automatically executed, in response to executing the content file, to track the content file across one or more first content outlets of the plurality of content outlets and one or more second content outlets of the plurality of content outlets that are disjunctive; and availing the performance and the measurement to the content providing entity.

14. The system of claim 13, wherein:

the plurality of content slots are provided by one or more first content outlets of the plurality of content outlets, the one or more potential digital content slots are provided by one or more second content outlets of the plurality of content outlets, and the one or more first content outlets of the plurality of content outlets are disjunctive with respect to the one or more second content outlets of the plurality of content outlets.

15. The system of claim 14, wherein the set of actions further includes executing the metadata file to receive the details about the recommended content item, wherein:

the details comprise data from the one or more first content outlets of the plurality of content outlets and the one or more second content outlets of the plurality of content outlets, and the metadata file is executed to track the recommended content item across the one or more first content outlets of the plurality of content outlets and the one or more second content outlets of the plurality of content outlets.

16. The system of claim 13, wherein:

the first metadata further indicates a likelihood of the receiving entity interacting with a corresponding content item of the plurality of content items and a tone of the corresponding content item of the plurality of content items;

the second metadata further indicates a tone of content surrounding a corresponding content slot of the plurality of content slots;

the third metadata indicates further a tone of content surrounding a corresponding potential digital content slot of the plurality of content slot; and the fourth metadata further indicates a likelihood of the receiving entity interacting with a corresponding potential content item and a tone of the corresponding potential content item.

17. The system of claim 13, wherein the set of actions further includes identifying the recommended content item based on comparing a combination of the first metadata, the second metadata, and the third metadata to the fourth metadata, wherein comparing the combination of the first metadata, the second metadata, and the third metadata to the fourth metadata comprises:

determining that a particular subset of the first metadata corresponding to the recommended content item is most similar to the fourth metadata; and accessing, via a query to a data repository including the first metadata, the recommended content item to generate the recommended content item package.

18. The system of claim 13, wherein:

the performance includes a performance report provided to the content providing entity, the performance report includes an indication of how frequently the receiving entity interacted with the recommended content item and a number of instances the recommended content item was inserted into one or more content slots or one or more potential digital content slots of the plurality of content slots, the measurement includes a measurement report used to adjust the recommended content item package, and the measurement report includes an indication of a similarity between the first metadata of each of the content item and the second metadata of content slots, or the third metadata of potential digital content slots, into which the recommended content item was inserted.

* * * * *

UNITED STATES PATENT AND TRADEMARK OFFICE
CERTIFICATE OF CORRECTION

| | | |
|---|---|---|
| PATENT NO. | : 12,340,391 B2 | Page 1 of 1 |
| APPLICATION NO. | : 18/676292 | |
| DATED | : June 24, 2025 | |
| INVENTOR(S) | : Canney et al. | |

It is certified that error appears in the above-identified patent and that said Letters Patent is hereby corrected as shown below:

On the Title Page

Column 1, item (72) under inventors, Line 9, delete "CT" and insert -- CA --, therefor.

Column 1, item (72) under inventors, Line 10, delete "CO" and insert -- CA --, therefor.

In the Specification

In Column 23, Line 53, delete "assignec." and insert -- assignee. --, therefor.

In Column 25, Line 6, delete "laaS" and insert -- IaaS --, therefor.

Signed and Sealed this
Fourteenth Day of October, 2025

John A. Squires
*Director of the United States Patent and Trademark Office*